US008352156B2

(12) United States Patent
McDonald

(10) Patent No.: US 8,352,156 B2
(45) Date of Patent: Jan. 8, 2013

(54) SYSTEM AND METHOD FOR CONTROLLING ENGINE COMPONENTS DURING CYLINDER DEACTIVATION

(75) Inventor: Mike M. McDonald, Macomb, MI (US)

(73) Assignee: GM Global Technology Operations LLC

( * ) Notice: Subject to any disclaimer, the term of this patent is extended or adjusted under 35 U.S.C. 154(b) by 720 days.

(21) Appl. No.: 12/578,085

(22) Filed: Oct. 13, 2009

(65) Prior Publication Data

US 2011/0087423 A1 Apr. 14, 2011

(51) Int. Cl.

| | |
|---|---|
| ***G06F 19/00*** | (2006.01) |
| ***F02B 77/08*** | (2006.01) |
| ***F02D 45/00*** | (2006.01) |
| ***F02D 13/06*** | (2006.01) |
| ***F02D 17/02*** | (2006.01) |
| ***F02D 29/02*** | (2006.01) |
| ***F02D 41/00*** | (2006.01) |

(52) U.S. Cl. ........ 701/103; 701/104; 701/109; 701/114; 123/488; 123/481; 123/198 F

(58) Field of Classification Search ............... 123/90.15, 123/90.16, 198 DB, 198 F, 325, 481, 488, 123/493; 701/101–104, 106, 107, 109, 110, 701/114, 115; 702/182, 183, 187
See application file for complete search history.

(56) References Cited

U.S. PATENT DOCUMENTS

| | | | | |
|---|---|---|---|---|
| 4,010,717 | A * | 3/1977 | Taplin | 701/103 |
| 4,134,368 | A * | 1/1979 | Hadley | 123/488 |
| 4,957,088 | A * | 9/1990 | Hosaka | 123/488 |
| 5,469,826 | A * | 11/1995 | Thomas et al. | 123/488 |
| 5,560,341 | A * | 10/1996 | Machida | 123/479 |
| 5,638,801 | A * | 6/1997 | Maki et al. | 701/104 |
| 5,920,617 | A * | 7/1999 | Berger et al. | 123/406.55 |
| 6,728,626 | B2 * | 4/2004 | Maira et al. | 701/114 |
| 7,146,966 | B2 * | 12/2006 | Nakamura | 123/481 |

* cited by examiner

*Primary Examiner* — Willis R Wolfe, Jr.

(57) ABSTRACT

An engine control system includes a power supply module, a measurement module, and a calibration module. The power supply module disables power supplied to N components of an engine when M cylinders of the engine are deactivated, wherein M and N are integers greater than or equal to one. The measurement module measures outputs of the N engine components. The calibration module calibrates the measurement module based on unpowered measurements from one or more of the N engine components during a period after the power supplied to the N components is disabled.

20 Claims, 3 Drawing Sheets

SYSTEM AND METHOD FOR CONTROLLING ENGINE COMPONENTS DURING CYLINDER DEACTIVATION

FIELD

The present disclosure relates to internal combustion engines, and more particularly to a system and method for controlling engine components during cylinder deactivation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet that may be regulated by a throttle. Intake valves of cylinders are opened to draw air into the cylinders. Fuel may be injected into one or more intake ports of the cylinders (i.e. port fuel injection) or directly into the cylinders (i.e. direct fuel injection). The air and fuel combine to create an air/fuel (A/F) mixture that is compressed and ignited within the cylinders to drive pistons and generate drive torque. The ignition of the A/F mixture may be via spark plugs (i.e. spark ignition) or due to high pressure and/or temperature (i.e. compression ignition).

A ratio of the A/F mixture may be controlled to regulate torque output of the engine. For example, the A/F ratio may be controlled based on a driver torque request, such as a position of an accelerator. Alternatively or additionally, one or more of the cylinders may be deactivated to regulate torque output of the engine. In other words, intake valves of cylinders to be deactivated may be closed and a supply of fuel to the cylinders to be deactivated may be disabled. For example, a number of activated cylinders may be based on the driver torque request.

SUMMARY

An engine control system includes a power supply module, a measurement module, and a calibration module. The power supply module disables power supplied to N components of an engine when M cylinders of the engine are deactivated, wherein M and N are integers greater than or equal to one. The measurement module measures outputs of the N engine components. The calibration module calibrates the measurement module based on unpowered measurements from one or more of the N engine components during a period after the power supplied to the N components is disabled.

A method includes disabling power supplied to N components of an engine when M cylinders of the engine are deactivated, and calibrating a measurement module based on unpowered measurements from one or more of the N engine components during a period after the power supplied to the N components is disabled, wherein M and N are integers greater than or equal to one.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
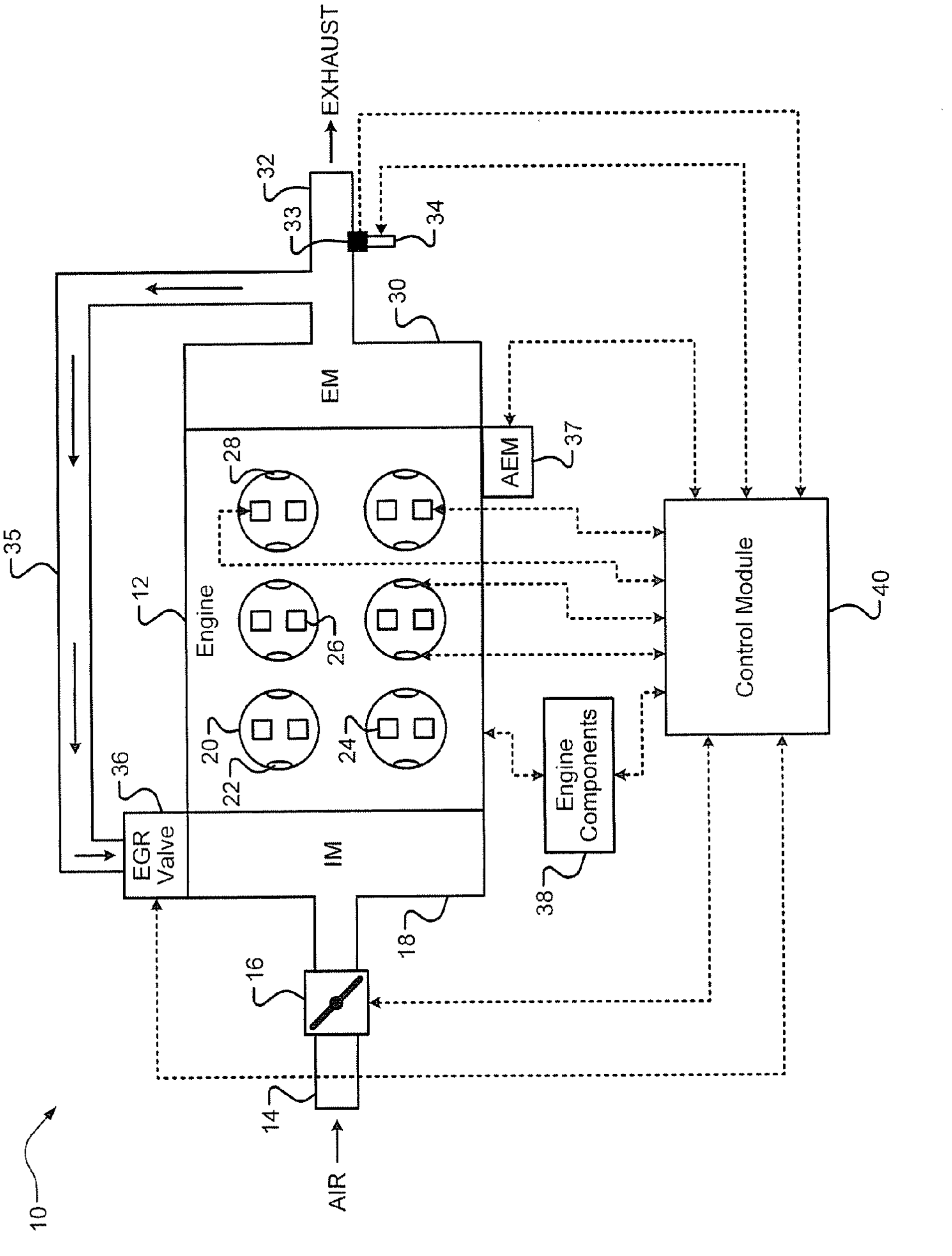
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A number of cylinders to be deactivated may be based on a driver torque request. The driver torque request may be based on a position of an accelerator (e.g., a pedal). For example, when the driver torque request is greater than a high torque threshold, all of the cylinders may remain active to output maximum engine torque. Alternatively, for example, when the driver torque request is less than or equal to a low torque threshold, all of the cylinders may be deactivated. For example only, the low torque threshold may be zero. In other words, all of the cylinders may be deactivated during vehicle stop and/or vehicle coastdown operation.

Various engine components (e.g. sensors, actuators, etc.), however, may continue operating during the period when all of the cylinders are deactivated. In other words, engine components may continue operating during the period, wasting electrical energy and/or increasing temperatures of the engine components. The engine components may be damaged by the excessive operation and/or increased temperatures. For example only, the various engine components may include, but are not limited to, oxygen ($O_2$) sensor heaters, mass air flow (MAF) sensors, fuel composition sensors, active engine mounts, exhaust gas recirculation (EGR) systems, fuel pumps, and pressure sensors (e.g., cylinder pressure sensors, air pressure sensors, barometric pressure sensors, etc.).

Therefore, a system and method is presented that decreases consumption of electrical energy by engine components and/or temperatures of the engine components during deactivation of all engine cylinders. More specifically, the system and method may disable power supplied to engine components during all-cylinder deactivation. Furthermore, the system and method may calibrate analog measurement circuits connected to the engine components while the supply of power is disabled. More specifically, the system and method may measure unpowered offset readings from the measurement circuits tied to the engine components. This calibration may be referred to as an "unpowered calibration."

Referring now to FIG. 1, an engine system 10 includes an engine 12. Air is drawn into an intake manifold 18 through an inlet 14 that may be regulated by a throttle 16. The air in the intake manifold 18 is distributed to cylinders 20 through intake valves 22. While six cylinders are shown, it can be appreciated that other numbers of cylinders may be implemented.

Fuel injectors 24 inject fuel into the cylinders 20. The fuel mixes with the air to create the air/fuel (A/F) mixture. While fuel injectors 24 implemented in each of the cylinders 20 are shown (i.e. direct injection), fuel may also be injected into one or more intake ports of the cylinders 20 (i.e. port fuel injection). The A/F mixture in the cylinders 20 is compressed using pistons (not shown) and ignited using spark plugs 26. The ignition of the compressed A/F mixture drives the pistons (not shown) which rotatably turn a crankshaft (not shown) generating drive torque.

Exhaust gas produced during combustion is expelled from the cylinders 20 through exhaust valves 28 and into an exhaust manifold 30. The exhaust gas may then be treated and expelled from the engine 12 through an exhaust system 32. The exhaust system 32 may further include one or more oxygen sensors 33 that measure oxygen content of the exhaust gas. Moreover, each of the oxygen sensors 33 may include an oxygen sensor heater 34 that heats the oxygen sensor 33. The exhaust gas may also be recirculated through an exhaust gas recirculation (EGR) line 35 and introduced into the intake manifold 18. The amount of EGR introduced into the intake manifold 18 may be regulated by an EGR valve 36. Active engine mounts (AEMs) 37, for example, may control the movement of a body of the vehicle generated by irregularities in a surface of a road.

Engine components 38 communicate with the engine 12. More specifically, the engine components 38 may include sensors and/or actuators that monitor and/or control operation of the engine system 10. In one embodiment, for example, the engine components 38 may include the oxygen sensors 33, the oxygen sensor heaters 34, the EGR valve 36, and the active engine mounts 37. However, as shown, the oxygen sensors 33, the oxygen sensor heaters 34, and the active engine mounts 37 may be separate from the engine components 38. Additionally, for example only, the engine components 38 may include sensors such as a mass air flow (MAF) sensor, a knock sensor, and a fuel composition sensor.

A control module 40 may regulate operation of the engine system 10. More specifically, the control module 40 may monitor a position of the throttle 16, positions of intake and exhaust valves 22, 28, timing of fuel injectors 24 and spark plugs 26. Additionally, the control module 40 may monitor the engine components 38, thereby monitoring measurements from the oxygen sensors 33, a position of the EGR valve 36, and variables such as MAF rate into the intake manifold 18, engine knock (i.e. vibration), and fuel composition (i.e. percentage of ethanol).

The control module 40 may also control the throttle 16 (e.g., electronic throttle control, or ETC), the intake and exhaust valves 22, 28, the fuel injectors 24, and the spark plugs 26. Additionally, the control module 40 may control the engine components 38 such as the oxygen sensor heaters 34, the EGR valve 36, the active engine mounts 37. The control module 40 may also implement the system and method of the present disclosure to calibrate one or more of the measurement circuits that are connected to engine components 38 when all of the cylinders 20 are deactivated.

Figure 2:
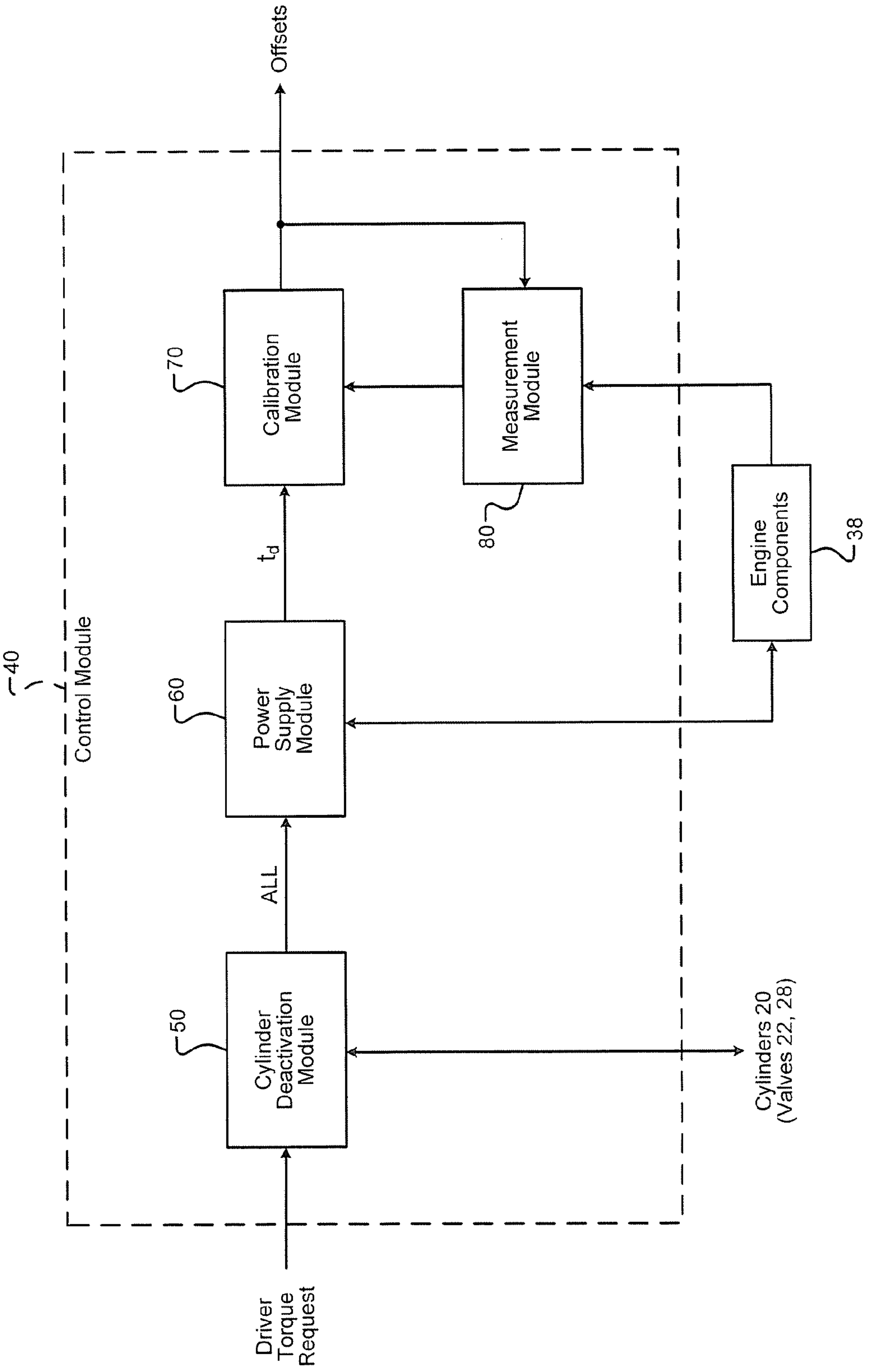
FIG. 2 is a functional block diagram of an exemplary control module according to the present disclosure.

Referring now to FIG. 2, the control module 40 is shown in more detail. The control module 40 may include a cylinder deactivation module 50, a power supply module 60, a calibration module 70, and a measurement module 80. The measurement module 80 may further include one or more measurement circuits that measure signals received from the various engine components 38.

The cylinder deactivation module 50 receives a driver torque request. For example, the driver torque request may be based on a position of an accelerator (e.g., a pedal). The cylinder deactivation module 50 may deactivate one or more of the cylinders 20 based on the driver torque request. For example, the cylinder deactivation module 50 may deactivate half of the cylinders 20 when the driver torque request is less than a first torque threshold. However, any number of the cylinders 20 may be deactivated based on the driver torque request.

In one embodiment, all of the cylinders 20 may be deactivated when the driver torque request is less than or equal to a second torque threshold. For example only, the second predetermined torque threshold may be zero. In other words, all of the cylinders 20 may be deactivated during coastdown of a vehicle or when the vehicle is stopped. When the cylinder deactivation module 50 deactivates all of the cylinders 20, the cylinder deactivation module 50 may generate a control signal ("ALL").

One of the cylinders 20 may be deactivated by controlling the air and fuel supplied to the cylinder 20. More specifically, the cylinder 20 may be deactivated by closing at least one of intake and exhaust valves 22, 28 of the cylinder 20 and disabling the fuel injector 24 and/or spark plug 26 associated with the cylinder 20. In other words, the airflow into and/or out of the cylinder 20 and the fuel and spark supplied for combustion within the cylinder 20 may all be disabled.

The power supply module 60 supplies power to the engine components 38. The power supply module 60 may also control wiring diagnostics of the engine components 38. More specifically, the power supply module 60 may run predetermined diagnostic routines on the engine components 38 to determine whether wiring in the engine components 38 is functioning properly. However, it can be appreciated that a different module may control wiring diagnostics of the engine components 38.

The power supply module 60 may disable power supplied to the engine components 38 after receiving the control signal ("ALL") from the cylinder deactivation module 50. The power supply module 60 may also disable wiring diagnostics of the engine components 38. The power supply module 60 may then initialize and start a timer ($t_d$) after disabling power supplied to the engine components 38.

The calibration module 70 receives a signal corresponding to the timer $t_d$. The calibration module 70 may perform unpowered calibrations of the measurement module 80 when the timer $t_d$ is greater than a predetermined time threshold ($t_{TH}$). More specifically, the calibration module 70 may measure outputs from the engine components 38 while they are unpowered.

The calibration module 70 may then determine offsets of the measurement module 80 (i.e., the measurement circuits) and calibrate the measurement module 80 using the determined offsets. The calibration module 70 may then set an offset read flag to one ("yes"). In other words, the unpowered calibrations may only be performed once.

Figure 3:
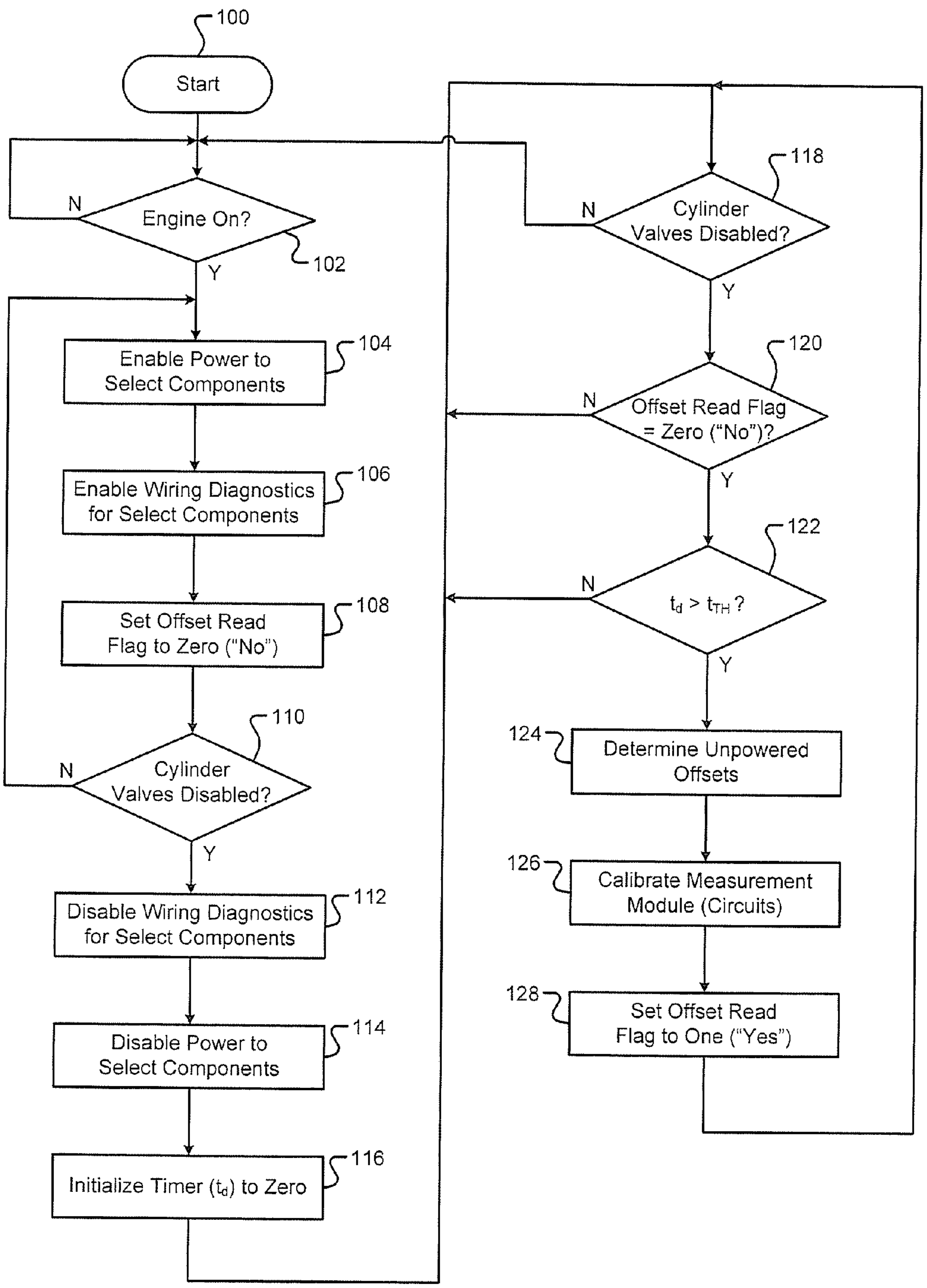
FIG. 3 is a flow diagram of an exemplary method for controlling engine components during cylinder deactivation according to the present disclosure.

Referring now to FIG. 3, a method for controlling engine components 38 of the engine system 10 during cylinder deactivation of the engine 12 begins in step 100. In step 102, the control module 40 determines whether the engine is on. If true, control may proceed to step 104. If false, control may return to step 102.

In step 104, the control module 40 enables power supplied to the engine components 38. In step 106, the control module 40 enables wiring diagnostics for the engine components 38. In step 108, the control module 40 sets the offset read flag to zero ("no").

In step 110, the control module 40 determines whether the cylinders 20 (e.g., valves 22, 28 and the fuel injector) are disabled. If true, control may proceed to step 112. If false, control may return to step 104. In step 112, the control module disables wiring diagnostics for the engine components 38. In step 114, the control module 40 disables power supplied to the engine components 38. In step 116, the control module 40 initializes the timer $t_d$ to zero and starts the timer $t_d$.

In step 118, the control module 40 determines whether the cylinders (e.g., valves 22, 28) are disabled. If true, control may proceed to step 120. If false, control may return to step 104. In step 120, the control module 40 may determine whether the offset read flag is zero ("no"). If true, control may proceed to step 122. If false, control may return to step 118.

In step 122, the control module 40 may determine whether the timer $t_d$ is greater than a predetermined time threshold $t_{TH}$. If true, control may proceed to step 124. If false, control may return to step 118. In step 124, the control module 40 may determine offsets of the measurement module 80 (i.e., one or more of the measurement circuits) based on unpowered readings from one or more of the engine components 38.

In step 126, the control module 40 may calibrate the measurement module 80 (i.e., one or more of the measurement circuits) based on the determined offsets. In step 128, the control module 40 may set the offset read flag to one ("yes"). Control may then return to step 118.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:

a power supply module that disables power supplied to N components of an engine when M cylinders of the engine are deactivated; and a calibration module that calibrates a measurement module based on unpowered measurements from one or more of the N engine components during a period after the power supplied to the N components is disabled, wherein M and N are integers greater than or equal to one.

2. The engine control system of claim 1, wherein M equals a total number of cylinders in the engine.

3. The engine control system of claim 1, further comprising:

a measurement module that includes L measurement circuits, wherein each of the L measurement circuits is connected to and configured to measure output of one or more of the N engine components, and wherein L is an integer greater than or equal to one and less than or equal to N.

4. The engine control system of claim 1, wherein the calibration module calibrates the measurement module a predetermined period after the M cylinders of the engine are deactivated.

5. The engine control system of claim 1, wherein wiring diagnostics for the N components are performed when the M cylinders are activated, and wherein wiring diagnostics for the N components are disabled when the M cylinders are deactivated.

6. The engine control system of claim 1, further comprising:

a cylinder deactivation module that deactivates the M cylinders by controlling at least one of intake and exhaust valves of the M cylinders, respectively, and fuel supplied to the M cylinders.

7. The engine control system of claim 6, wherein the number of deactivated cylinders is based on a driver torque request.

8. The engine control system of claim 1, wherein the N components include at least one of engine sensors and actuators.

9. The engine control system of claim 8, wherein the engine sensors include a mass air flow sensor, a knock sensor, a fuel composition sensor, a cylinder pressure sensor, an intake manifold pressure sensor, and a barometric pressure sensor.

10. The engine control system of claim 8, wherein the engine actuators include oxygen sensor heaters, active engine mounts, an exhaust gas recirculation valve, and fuel pumps.

11. A method, comprising:

disabling power supplied to N components of an engine when M cylinders of the engine are deactivated; and calibrating a measurement module based on unpowered measurements from one or more of the N engine components during a period after the power supplied to the N components is disabled, wherein M and N are integers greater than or equal to one.

12. The method of claim 11, wherein M equals a total number of cylinders in the engine.

13. The method of claim 11, wherein the measurement module includes L measurement circuits that are each connected to and configured to measure output of one or more of the N engine components, wherein L is an integer greater than or equal to one and less than or equal to N.

14. The method of claim 11, further comprising:

calibrating the measurement module a predetermined period after the M cylinders of the engine are deactivated.

15. The method of claim 11, further comprising:

performing wiring diagnostics for the N components when the M cylinders are activated, wherein wiring diagnostics for the N components are disabled when the M cylinders are deactivated.

16. The method of claim 11, further comprising:

deactivating the M cylinders by controlling at least one of intake and exhaust valves of the M cylinders, respectively, and fuel supplied to the M cylinders.

17. The method of claim 16, wherein the number of deactivated cylinders is based on a driver torque request.

18. The method of claim 11, wherein the N components include at least one of engine sensors and actuators.

19. The method of claim 18, wherein the engine sensors include a mass air flow sensor, a knock sensor, a fuel composition sensor, a cylinder pressure sensor, an intake manifold pressure sensor, and a barometric pressure sensor.

20. The method of claim 18, wherein the engine actuators include oxygen sensor heaters, active engine mounts, an exhaust gas recirculation valve, and fuel pumps.

* * * * *